United States Patent [19]
Hamilton et al.

[11] 3,763,905
[45] Oct. 9, 1973

[54] TREE HARVESTER

[75] Inventors: Douglas D. Hamilton, Mount Royal; Joseph J. R. Boivin, Montreal; Domenico Benedetto, Vancouver, all of Canada

[73] Assignee: Logging Development Corporation, Montreal, Quebec, Canada

[22] Filed: Nov. 30, 1971

[21] Appl. No.: 203,135

Related U.S. Application Data

[63] Continuation of Ser. No. 794,673, Jan. 28, 1969, abandoned.

[30] Foreign Application Priority Data
Jan. 29, 1968  Canada .............................. 011,008

[52] U.S. Cl. ............. 144/3 D, 144/2 Z, 144/309 AC
[51] Int. Cl. ............................................. A01g 23/02
[58] Field of Search ............. 144/2 Z, 3 D, 309 AC, 144/34 R, 34 E

[56] References Cited
UNITED STATES PATENTS

| 3,102,563 | 9/1963 | Horncastle .......................... 144/3 D |
| 3,196,911 | 7/1965 | Busch et al. ........................ 144/34 R |
| 3,348,592 | 10/1967 | Winblad et al. ..................... 144/3 D |
| 3,356,116 | 12/1967 | Brundell et al. ..................... 144/326 |
| 3,516,462 | 6/1970 | Martinson et al. .................. 144/3 D |

*Primary Examiner*—Gerald A. Dost
*Attorney*—Burton L. Lilling et al.

[57] ABSTRACT

A mobile self-propelled tree processing machine which includes an extendible and retractable boom pivotally mounted on an articulated vehicle and having a felling head assembly attached to the free end of the knuckle boom. The felling head includes a grapple and shear assembly mounted on a common frame. Attached also to the vehicle is a tree processing assembly or package which includes a delimber of the stripper type, a shear, and tree feed means interposed therebetween and secured to a common frame which is connected to the vehicle by a pair of arms vertically movable for selectively moving the processing assembly relative to a cradle also attached to the vehicle and for receiving logs discharged from the processing assembly. The processing assembly is vertically movable to minimize vertical drop of processed logs onto those previously deposited in the cradle. The cradle is movably mounted on the vehicle to facilitate dumping the same. The tree processing assembly is of a side feed type whereby a tree may be inserted laterally into all of the units simultaneously, and in order to effect this, the delimber includes stripper arms pivotally mounted on a pair of jaw members pivotally secured to a frame. The delimber further is constructed in such a manner that means is provided to bias the arms to engage a tree with selected arms interconnected by resilient means allowing relative movement of the arms relative to one another. The delimber further is constructed in such a manner and includes means for biasing the arms together and holding the jaws formed by a pair of pivot levers to a closed position and also to an open position and is accomplished by resilient means in combination with an over-centre lever assembly.

5 Claims, 14 Drawing Figures

TREE HARVESTER

This is a Continuation of application Ser. No. 794,673 filed Jan. 28, 1969. and now abandoned.

This invention relates to mobile apparatus for handling trees, to mobile apparatus for harvesting and processing trees, to novel components utilized for processing trees, and to a method of logging.

There are numerous known pieces of equipment which are mobile for use in handling trees and particularly harvesting trees which include gathering the trees, processing the trees and disposing of the processed logs. The equipment, in general, may be classified according to the type of operation, one type being site processing and another type being stump processing. In the first type, trees are felled, collected and brought to a common area. A mobile processor of the site type then performs the operation of picking up the trees in sequence and feeding the trees to components on the machine for effecting the required processing operations. An example of such type of processor is U.S. Pat. No. 3,351,107 issued Nov. 7, 1967. Another example of equipment in this general category is U.S. Pat. No. 3,236,274 issued Feb. 22, 1966 to J. E. Eynon. In the second type of timber processing machines, there are numerous different kinds of stump harvesting machines. Examples of such are found in the following U.S. Pat. Nos. 3,348,592 issued Oct. 24, 1967 to R. A. Winblad et al.; 3,183,954 issued May 18, 1965 to R. W. Larson; 3,140,736 issued July 14, 1964 to R. L. Propst; 3,074,446 issued Jan. 22, 1963 to O. L. Earle; and Canadian Patent Number 757,879 issued May 2, 1967 to T. N. Busch.

In the latter type of equipment, the mobile vehicle is driven to a standing tree which is then severed by a shear mechanism on the vehicle and the severed tree is manipulated into a processing position. In some instances, the processed wood is collected, as for example, in the Busch and Winblad equipment.

The present invention is concerned, in one aspect, with the latter type of equipment, i.e., a stump processing machine. In the above-enumerated patented devices, it will be found that the entire vehicle must be manipulated so as to position the shear mechanism appropriately for severing each individual tree.

One object of the present invention is to provide a machine where it may be manoeuvered into the general vicinity of one or more standing trees and thereafter manoeuver only the felling head into a tree-engaging and severing position. This type of operation minimizes moving the vehicle in order to sever several trees in close proximity to one another. It is readily apparent that manoeuvering mobile pieces of equipment over terrain such as is commonly found in treed areas becomes somewhat difficult. There are numerous hazards such as stones, rocks, boulders, uneven terrain, stumps, and the like. By being able to move the vehicle into the general vicinity of the trees, the operator is able to select a path of minimum resistance for moving the vehicle. Also, the operator is able to direct considerably more of the machine's and his effort to processing the trees rather than manoeuvering the vehicle.

A further object of the present invention is to provide a tree processing unit which is a sub-assembly or component part that may be readily attached or mounted on any type of vehicle for use in processing trees. In the aforementioned U.S. Pat. No. 3,351,107, there is disclosed a tree processing sub-assembly which includes in combination at least one or any combination of a delimber, a debarker and a shear along with means for feeding a tree to be processed through the processing unit. The processor sub-assembly includes sophisticated components and one object of the present invention is to provide a simplified processing sub-assembly.

A still further object is to provide a simplified sub-assembly for processing trees, which sub-assembly is relatively light and thereby adapted for being mounted on the end of a boom such that it might be manipulated to facilitate handling and processing trees.

In one aspect of the present invention, there is provided a tree processor comprising in combination a mobile vehicle, an extendible and retractable boom mounted on said vehicle and including a felling head for grasping, severing and felling a standing tree, a processing assembly mounted on said vehicle and including at least one or any combination of a delimber, a debarker and severing means for processing the felled tree, said processing assembly having an axis along which a tree travels during processing, disposed substantially horizontal, means for feeding a tree through said processing assembly, and a cradle for receiving the processed trees discharged from said procesing assembly.

In the foregoing patented machines, it will be noted that some of the machines process the tree while the latter is substantially vertical, for example U.S. Pat. Nos. 3,348,592 and 3,183,954, while others process the tree with the latter disposed substantially horizontal as exemplified by the aforementioned Canadian Patent Number 757,879. The first type may be considered a vertical processor while the latter may be considered a horizontal processor. It is obvious that the tree may be inclined at a slight angle to the horizontal in the one type and the tree also may be inclined to the vertical in the other type. The present mobile processor is of the horizontal type, that is, the tree being processed is substantially horizontal.

In a further aspect of the present invention, there is provided in a machine for processing trees which includes in combination means for processing trees including at least one or any combination of a delimber, a debarker, and a shear, and means for collecting a plurality of trees in sequence discharged from the processing means, an improvement comprising mounting the processing means on the machine such that it may be moved vertically relative to the tree collecting means whereby the discharge position of the processing means may be selectively varied minimizing the vertical drop of processed trees discharged therefrom onto previously processed trees collected in said collecting means.

In a still further aspect of the present invention, there is provided a method of logging which comprises in combination the steps of (a) manoeuvering a vehicle into the general vicinity of a standing tree; (b) manoeuvering a felling head attached to an extendible and retractable boom permitting movement of the felling head towards and away from the vehicle so as to position the felling head around the trunk of a selected tree for severing the same; (c) severing and felling said selected standing tree; (d) introducing the butt end of said felled tree directly into a processing assembly which includes at least one or any combination of a delimber, a debarker and severing means; (e) propelling said tree along a substantially horizontal axis; (f) manoeuvering said felling head and/or said vehicle to sever and fell further trees successively and continuing the sequence of felling trees and feeding the same to the processing assembly while collecting a selected quantity of processed trees; and (g) discharging the collected processed trees onto a suitable supporting surface.

A still further object of the present invention is to provide a tree processing machine of the foregoing type wherein the tree collecting means consists of a cradle of the bottom-dump type.

A still further object of the present invention is to provide a vehicle which may be utilized to process trees and of the stump type wherein the vehicle may be manoeuvered into the general vicinity of standing trees, sever the same and feed the severed and felled tree to processing units, and while processing the same permit manoeuvering the vehicle into the general vicinity of a further tree for subsequent processing thereof.

The invention is illustrated, by way of example, in the accompanying drawings wherein.

Referring now in detail to the drawings, there is illustrated a processing machine 10 consisting of a mobile, self-propelled vehicle 20, an extendible and retractable boom 30 pivotally secured to the vehicle for movement about a vertical axis, a felling head 40 mounted on the free end of the extendible and retractable boom, a cradle 60 movably mounted on the chassis of the vehicle 20 for receiving processed trees and dumping the same on the ground, and a tree processing assembly or package 70 mounted on the vehicle at a position rearwardly of the cradle 60 such that processed wood discharged therefrom may be dumped into the cradle and in such a manner that it may be moved vertically relative thereto.

The vehicle 20 is an articulated type having a front chassis 21 pivotally connected to a rear chassis 22 by suitable pins for relative movement about a vertical axis generally indicated as 23. The front and rear chasses are supported upon wheels 24 driven by a motor (not shown) on the front chassis 21 through a suitable power train. The front chassis 21 also includes a framework 25 providing a protective area for an operator and the framework carries an upper roof or plate member 26 on which the boom is pivotally mounted for movement about a vertical axis generally indicated as 27. The framework 25 provides a cab or protected area for an operator who may be seated adjacent suitable controls for the vehicle. Preferably the vehicle is hydraulically operated and may be, for example, one commercially presently available and sold under the commercial name Clark Forwarder. For further description and reference to such vehicle, reference may be had to Canadian Patent No. 859,489 issued Dec. 29, 1970.

The extendible and retractable boom 30 consists of a pair of members 31 and 32 pivotally interconnected by a pivot pin 33. Movement of the arm 32, relative to arm 33, may be effected by a hydraulic piston-cylinder assembly 34 having the piston rod 35 and the cylinder portion 36 pivotally connected respectively to members 31 and 32 by respective pivot pins 37 and 38. The pivot pin 38 is located on a portion of the member 32 which extends beyond the pivotal connection of such member to the member 31 by the pin 33. The boom member 31 is pivotally connected to a boom mounting member 39 by a pin 39A. Pivoting of the boom member 31 is selectively controlled by actuation of a double acting hydraulic piston-cylinder assembly 31A connected at opposed ends by pins 31B and 31C respectively to members 31 and 39. The boom mounting member 39 may be any type, preferably suitable for continuous 360° rotational movement of the boom about the vertical axis 27. This may be accomplished by a rotary hydraulic coupling having a stator portion and a rotor respectively secured to the cab roof plate 26 and the boom mounting member 39. If desired, the operator within the cab may be mounted on a member which rotates with the rotary mount portion 39 so as to minimize the fluid couplings. Such an embodiment or piece of equipment is described in the aforementioned Canadian Patent No. 859,489.

The felling head 40 is pivotally secured to the free end of the boom member 32 by pivot pin 41 and movement thereabout may be effected by a hydraulic piston-cylinder assembly 42 pivotally connected at opposed ends respectively to the boom member 32 and the felling head 40 by respective pins 42A and 42B.

Figure 9:
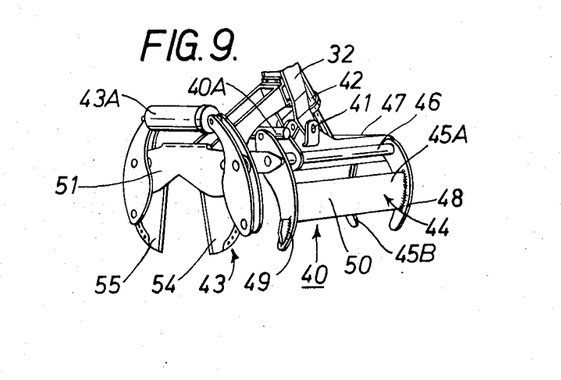
FIG. 9 is an oblique view of the felling head which consists of a grapple and a shear, pivotally mounted on the end of a boom.
Figure 10:
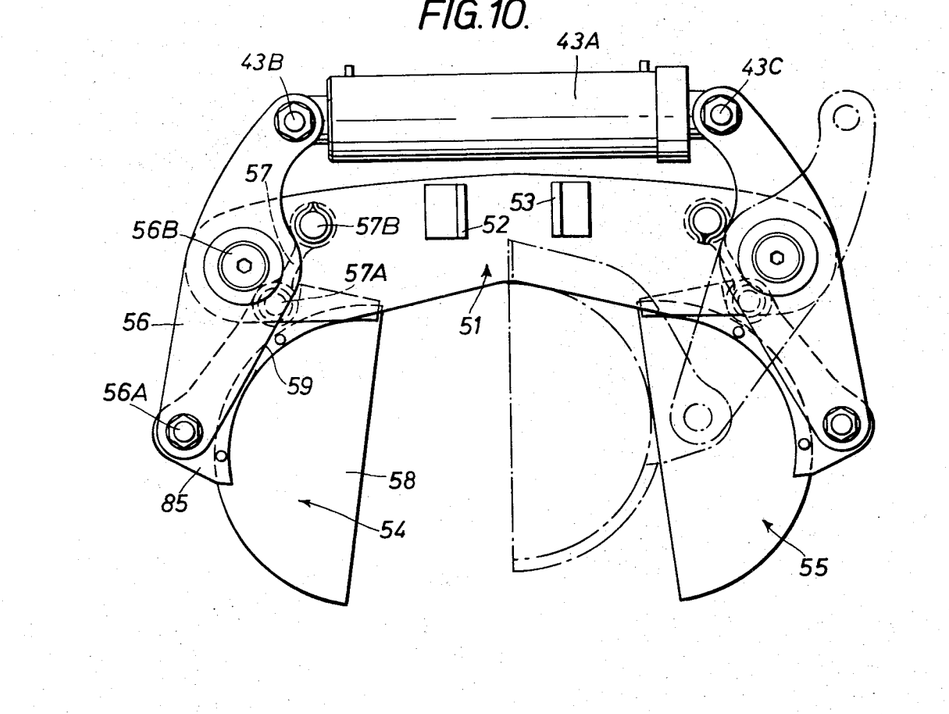
FIG. 10 is a top plan view of the shear mechanism portion of the felling head.

The felling head 40 consists of a tree severing or shear mechanism 43 and a grapple mechanism 44. The felling head may be of any type, for example, that illustrated in Canadian Patent 791,445 issued Aug. 6, 1968. Referring to FIGS. 9 and 10, the grapple 44 and a shear 43 are mounted on a common frame which is pivotally secured by pivot pin 41 to the boom 32.

The grapple 44 consists of a pair of jaw members 45a and 45b pivotally secured by a pin 46 to a frame member 47. The frame 47 is pivotally secured to the boom by the pin 41 passing through a plurality of lugs secured to the frame 47. Each jaw member 45a and 45b includes a pair of arcuate plates 48 and 49 interconnected by a web member 50. The arcuate members 48 and 49 are disposed in spaced relation to enable gripping a selected length of a tree to facilitate manipulating the same during the tree felling operation, and also to facilitate introducing the felled tree into the processing assembly.

The shear mechanism consists of a frame 51 secured as, for example, by a pair of lugs 52 and 53 to the lower end of the frame member 47. The frames 51 and 47 are rigid with respect to one another but, if desired, may be detachably secured together by bolts or the like. The shear further includes a pair of shear blades 54 and 55 each attached to the frame 51 by a pair of levers 56 and 57. Each shear blade 54 and 55 consists of a cutting blade member 58 detachably secured to a holder member 59 which is pivotally connected to the lever arms 56 and 57 respectively by pivot pins 56a and 57a. The link or lever member 57 is pivotally attached to the shear frame 51 by a pivot pin 57b. Similarly, the lever 56 is pivotally atttached to the shear frame 51 by a pivot pin 56b. The pivot pins 56a and 56b, and 57a and 57b are so arranged as to effect desired arcuate movement of the cutting edge of the shear blades during a severing operation. The lever arms 56 each have a portion projecting rearwardly from the pivot pin 56b beyond the frame 51, and such projecting end portions are interconnected by a hydraulic shear cylinder 43A. The shear cylinder 43A is connected to respective ones of the pair of lever arms 56 by pivot pins 43B and 43C. The shear cylinder is a double-acting type which may be extended and retracted, respectively, to close and open the shear jaws for severing a tree.

Figure 1:
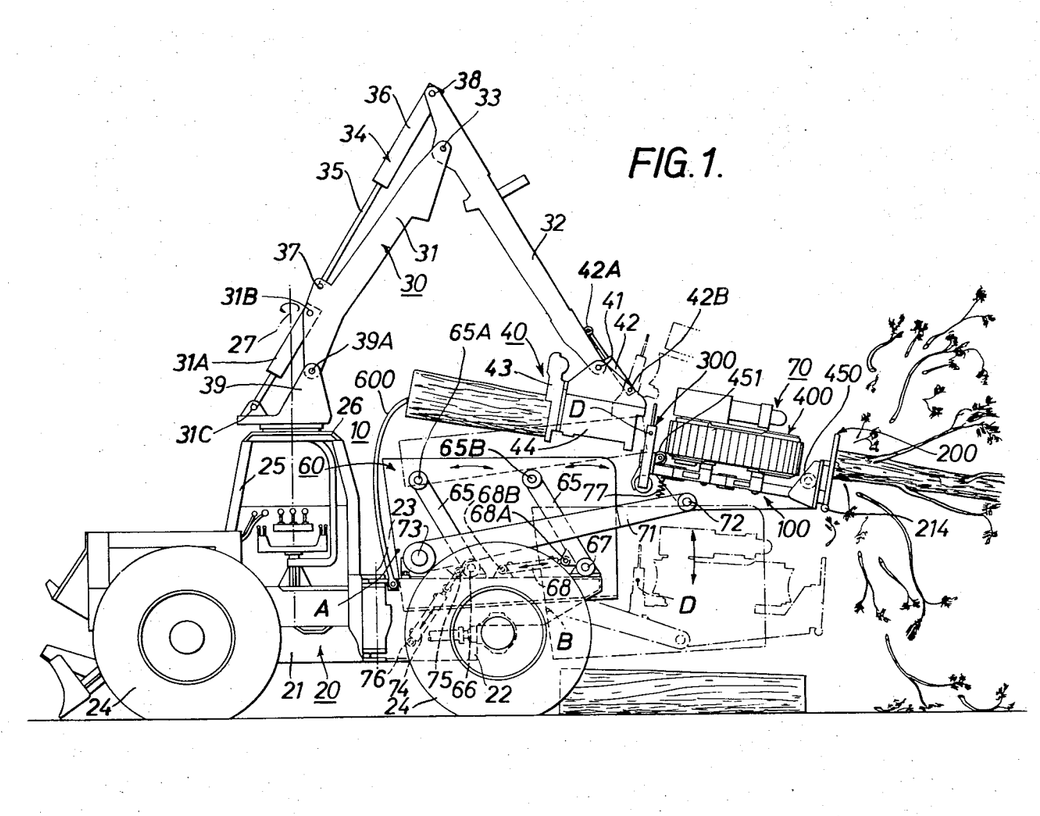
FIG. 1 is a diagrammatic side elevational view of a mobile tree processing machine.

The cradle 60 (see FIG. 11) consists essentially of a container having opposed side walls 61 and 62 interconnected by an end wall 63 and a bottom wall 64. The cradle 60 is connected to the rear chassis 22 of the articulated vehicle by a plurality of links 65, each pivotally connected respectively to the cradle 60 and the rear chassis 22 of the vehicle 20. As illustrated in FIG. 1, a pair of links 65 are pivotally connected at one end to the cradle wall 61 by respective pivot pins 65A and 65B and the opposite ends of the links are pivotally connected to the chassis respectively by pivot pins 66 and 67. A pair of links 65 are similarly connected to the cradle side wall 62 and the chassis 22 and the links are arranged effectively in a parallelogram for a purpose which will become apparent hereinafter. The pivot pins 66 and 67, that is the pivotal connection of the levers to the chassis, are located rearwardly of the pivot pins 65A and 65B connecting the arms to the cradle. They are located in such a position that the cradle may be moved through an arcuate path as for example by one or more hydraulic piston-cylinder assemblies 68 pivotally connected respectively by pins 68A and 68B to a link 65 and vehicle chassis 22. Extension and retraction of the hydraulic piston-cylinder assembly 68 effects movement of the cradle through an arcuate path between a normal load position designated generally as A in FIG. 1, with the cradle being illustrated in solid line in such position and a further position designated generally as B which is the discharge position. The cradle is illustrated in phantom in the latter position at which position it is disposed rearwardly of the rear axle of the vehicle. This permits utilizing a bottom-dump type cradle whereby a load of processed logs may be collected and therefater deposited in a neat pile on a suitable supporting surface, i.e., the ground in the forest where trees are being processed by the machine in question.

Figure 12:
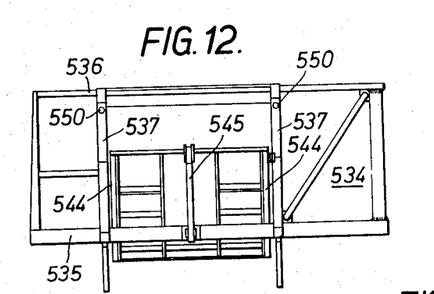
FIGS. 12, 13 and 14 are side, top plan and sectional views of a cradle of the bottom-dump type.
Figure 13:
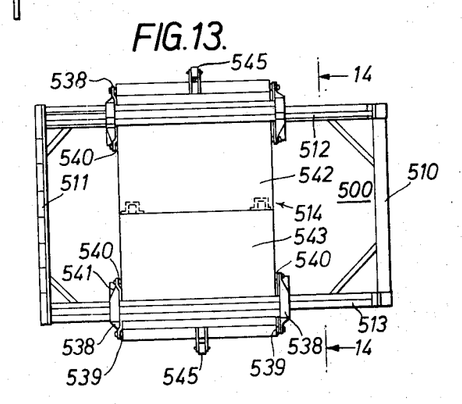
Figure 14:
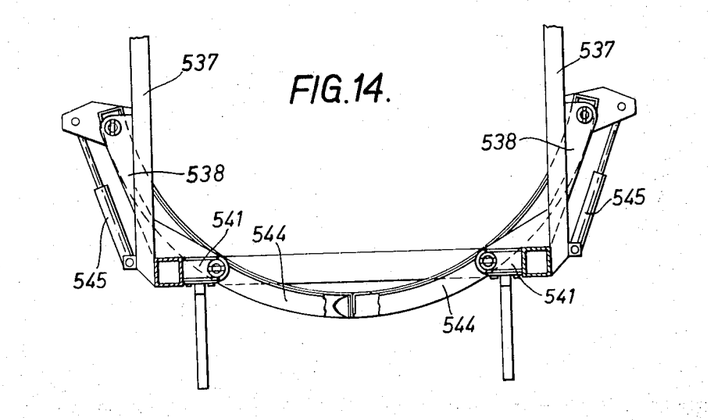

A bottom-dump type of cradle is illustrated in FIGS. 12-14 where the bottom wall consists of a pair of doors mounted by sliding pivots for movement through an arcuate path from an open to a closed position and vice versa. Referring now to the cradle illustrated in these Figures, there is illustrated a bottom-dump cradle 500 which includes a framework of rigid members providing a front wall 510, a rear wall 511, and a pair of opposed side walls 512 and 513. The bottom wall consists of a gate 514 provided by a pair of slidably mounted doors. Each of the side walls 512 and 513 is defined by a horizontal beam 535 at the lower edge and a horizontal bar member 536 at the upper edge. The beam 535 and bar 536, in the respective walls, are joined by a pair of vertical upright members 537. A pair of lugs 538, having a roller 539 journalled thereon, project outwardly from each of the uprights 537. The roller on one upright faces toward the roller on the other upright for a purpose which will become apparent hereinafter. A second pair of rollers 540 are journalled to respective ones of a pair of brackets 541 projecting inwardly toward one another from each of the beams 535. Again, the rollers as in the previous case face in a direction toward one another. The gate 514 is slidably mounted on the rollers and consists of a pair of arcuate door members 542 and 543. Each door includes a channel 544 in opposed arcuate marginal edges thereof and the rollers 540 and 539 rollingly engage the channels thereby providing a sliding guide for the doors in movement to and from an open and closed position. Sliding movement of the doors is effected by a pair of hydraulic piston-cylinder assemblies 545. Each cylinder has one end thereof anchored to the rigid framework, for example beam 535, and the other end thereof is pivotally connected to the door.

The cradle illustrated in FIGS. 12 and 13 may be utilized on a vehicle of the type illustrated in FIG. 1 by pivotally connecting the upper end of the link members 65 to the rigid framework of the cradle, for example, by respective ones of a pair of pins 550 projecting outwardly from the pair of upright members 537. Alternatively, the cradle of FIGS. 12 and 13 may be mounted on a vehicle having a rear chassis which consists of a generally U-shaped frme having the opening thereof directed toward the rear of the vehicle. In such case the cradle may be securely fastened to the chassis and dumping may be effected by opening the doors and dropping by gravity the load of processed logs between the frame members. In a bottom-dump cradle of the type illustrated in FIGS. 12, 13 and 14, the rear wall 511 may be either open or closed.

Figure 11:
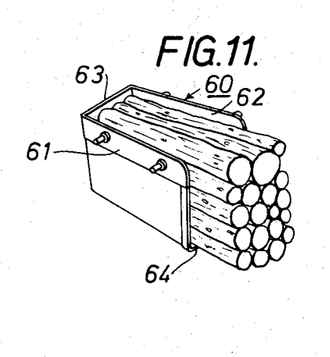
FIG. 11 is an oblique view of the cradle removed from the machine and loaded with processed tree bolts.

The cradle 60 alternatively may be an open-ended box member as illustrated in FIG. 11 in which case the links 65 may be loated such that the cradle tilts rearwardly in a discharge or unloading position so that the processed trees may be slid endwise out of the cradle. In such instance, the links would preferably be such that the bottom wall of the cradle slopes downwardly rearwardly from the vehicle to facilitate sliding the logs outwardly therefrom. A relatively neat pile of logs may be obtained by lowering the trailing end of the cradle to a position adjacent the ground and after the logs have contacted the ground, the vehicle may then be driven forwardly to facilitate sliding the logs out of the cradle.

The processing assembly 70 is pivotally mounted on a pair of lever arms 71, located one on each side of the cradle 60, and each pivotally secured at one end to the processing assembly by a pivot pin 72 and at the other end by a pivot pin 73 to the vehicle chassis 22. The lever arms 71 may be pivoted about the pin 72 by extending and retracting a hydraulic piston-cylinder assembly 74 pivotally connected at one end by a pin 75 to the lever arm 71 and at the other end by a pivot pin 76 to the vehicle chassis 22. The processing assembly 70 consists of a support frame member 100 pivotally secured to the arms 71 by the aforementioned pivot pin 72. The frame 100 is connected also to the arms 71 by a resilient connection at a point in spaced relation with respect to pivot pin 72. The resilient connection, for example, may be a tension or compression spring depending upon the centre of gravity of the processing assembly 70 with respect to the pivot pin 72. The resilient connection is illustrated in FIG. 1 as a coil spring designated generally by the reference numeral 77 and is anchored at a pair of spaced positions respectively to the frame 100 and the lever arm 71. If desired, the compression spring may be pneumatic, hydraulic, a coil spring or even a body of compressible material, for example, rubber or the like.

The processing assembly 70 includes a delimber 200 secured to frame 100 adjacent one end thereof, and a shear mechanism 300 disposed adjacent the opposite end thereof. The processing assembly 70 further includes a tree feed mechanism 400 secured to the frame 100 and disposed at a position intermediate the delimber and the shear.

The frame 100 consists of a pair of box beams 101 and 102 interconnected at one end by a plate 103 and at the opposite end by a plate 104. A first pair of outer flanges 105 and 106 are secured to the respective box members 101 and 102 and project upwardly therefrom. The flanges 105 and 106 have respective apertures 107 and 108 disposed in axial alignment. A further pair of flanges 109 and 110 are secured to respective box members 101 and 102 (on adjacent faces thereof) and project upwardly therefrom substantially parallel to the flanges 105 and 106. The flanges 109 and 110 are connected by a sleeve 111 having the bore thereof in axial alignment with the apertures 107 and 108. The pivot pin 72 passes through the aligned apertures and the sleeve and provides pivotal mounting of the frame 100 on the lever arms 71. The flanges 109 and 110 include a further pair of apertures 112 and 113 disposed in axial alignment and such apertures may be utilized for pivotally connecting the member 71 to the frame 100. Alternatively, a hydraulic piston-cylinder assembly may be pivotally connected by a pin passing through the apertures 112 and 113 which, of course, may be sleeved if necessary to provide the required bearing area.

A pair of lugs 114 and 115 are secured to each of the box members 105 and 106 and project outwardly therefrom substantially perpendicular to the previously described flanges 105, 106, 109 and 110. The flanges 114 and 115 are apertured to receive a pin 415. A further set of flanges 117 and 118 are similarly secured to each of the beam members 101 and 102 and are disposed in horizontal spaced relation with respect to the flanges 114 and 115. The flanges 117 and 118 are apertured to recieve a pivot pin 413.

Figure 2:
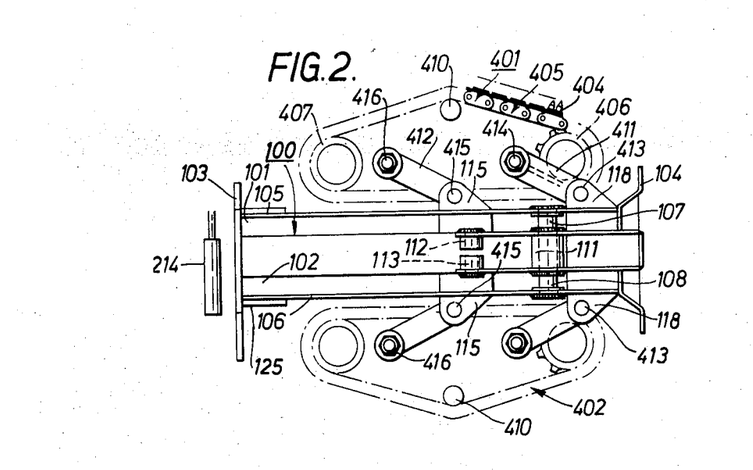
FIG. 2 is a bottom view of the processing assembly mounted on the vehicle, such processing assembly including a shear mechanism, a delimber and feed means for propelling a tree through the processing unit.
Figure 3:
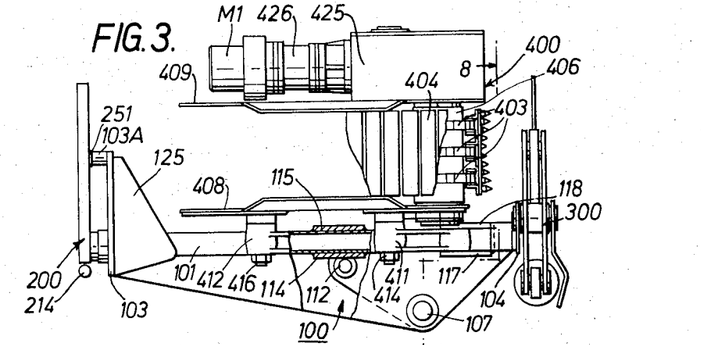
FIG. 3 is a side elevational view of FIG. 2.

The flange 104 previously described as interconnecting the beam members 101 and 102 is bow-shaped in plan view as will be noted from FIG. 2 and may be welded or otherwise rigidly secured to the box beams 101 and 102 and also to the upstanding flanges 105, 106, 109 and 110. The flange 104 extends laterally beyond the box beam members and the shear mechanism is secured thereto as, for example, by a plurality of bolts 301, 302 and 303.

The shear mechanism is the same as is described in the aforementioned Canadian Patent 791,445. Basically, the shear mechanism 300 consists of a frame 304 to which is secured a pair of knife members 305, each by a pair of levers 306 and 307. The levers 306 and 307 are arranged in a parallelogram with the pivot points disposed such that the cutting blade may move through an arcuate path during opening and closing of the shear jaw, i.e., movement of the cutting edges of the shear mechanism toward and away from one another. The pair of arms 306, that is, one arm for each knife member, are interconnected by a common hydraulic cylinder 308 which, by suitable control of hydraulic circuitry, effects opening and closing of the jaw respectively to receive and sever a tree.

The delimber mechanism is secured to the frame 100 adjacent an end thereof opposite to that of the shear. The delimber may be detachably secured as by bolts or may be permanently secured as by welding or the like to the end flange or plate member 103.

The delimber 200 consists of a pair of jaw members 201 and 202 pivotally mounted respectively on pins 203 and 204 rigidly secured to and projecting outwardly from the flange or plate 103. The jaw members 201 and 202 may be suitably retained on the pins by a locknut or other anchor member 205. The jaw members 201 and 202 are held in spaced relation with respect to the plate 103 by a boss or annular rib 205A. The jaws 201 and 202 each consist of a pair of plate members 206 and 207 interconnected by four equally spaced annular bosses 208, the purpose of which will be described hereinafter. The plates 206 and 207 are further interconnected by an annular boss 209 which projects outwardly from the plate 207 and which, on the jaws 201 and 202, circumscribes respective pins 203 and 204. A bushing of friction-reducing material, such as neoprene or the like, may be utilized between sleeve 209 and the respective pins.

The jaw members 201 and 202 have respective lugs 210 and 211 projecting outwardly therefrom adjacent the pivot pins 203 and 204. The lugs 210 and 211 are apertured to receive respective pivot pins 212 and 213 connecting a common hydraulic piston-cylinder assembly 214 to the lugs for effecting opening and closing of the jaw provided by jaw members 201 and 202. The hydraulic piston-cylinder assembly 214 is preferably a double-acting type which may be utilized to force the arms from an open to a closed position and also from a closed to an open position. It will become apparent hereinafter that the jaw members 201 and 202 may be opened such that a tree, to be processed, can be inserted into the jaw of the processor by moving the tree in a direction generally perpendicular to the direction the tree will ultimately travel during processing thereof. Loading the delimber in this manner may be referred to as a side load. By utilizing a delimber of this type, it is not necessary to move the tree to a position rearwardly of the processing assembly, i.e., to the extreme right as viewed in FIG. 1, before being able to insert it into the processing assembly as is necessary in an end load type. Seldom are branches located near the butt end of the tree and, accordingly, there is no need for passing the entire length of the tree through the processing assembly unless, of course, a debarker is utilized to provide a debarked tree.

The delimber is of a stripper type having a plurality of arms with cutting edges engageable with the tree for removing limbs and/or bark. Stripper type delimbers are known and may be utilized either to delimb or debark or both delimb and debark. Examples of stripper type delimbers are found in, U.S. Pat. No. 3,183,949 issued May 18, 1965;
U.S. Pat. No. 3,074,446 issued Jan. 22, 1963; and
U.S. Pat. No. 3,059,677 issued Oct. 23, 1962.

The delimber illustrated in the present drawings is a modified type and includes a pair of arms 215 and 216 pivotally secured to the jaw member 201 and a further pair of delimber arms 217 and 218 pivotally secured to the jaw member 202. The arms 215, 216, 217 and 218 are pivotally secured on the respective jaw members as, for example, by being journalled on a pin 219 projecting outwardly from and secured to the respective sleeve members 208. The arms may be retained on the respective pins by suitable retainers, for example, "C" clips, lock nuts, or the like. Each arm 215, 216, 217 and 218 is substantially arcuate relative to a plane perpendicular to the path the tree travels while being processed. The arms are directed inwardly toward the central axis of the delimber so as to engage a tree for processing and are in staggered relation, as viewed in FIG. 5, so as to overlap one another. This permits moving the arms toward and away from one another allowing for processing trees of various diameters. Each arm is generally L-shaped in cross-section in the direction parallel to the path of travel of a tree being processed and there is provided a cutting edge 220 for engaging and severing limbs from a tree drawn therethrough by the feed mechanism 440.

Figure 5:
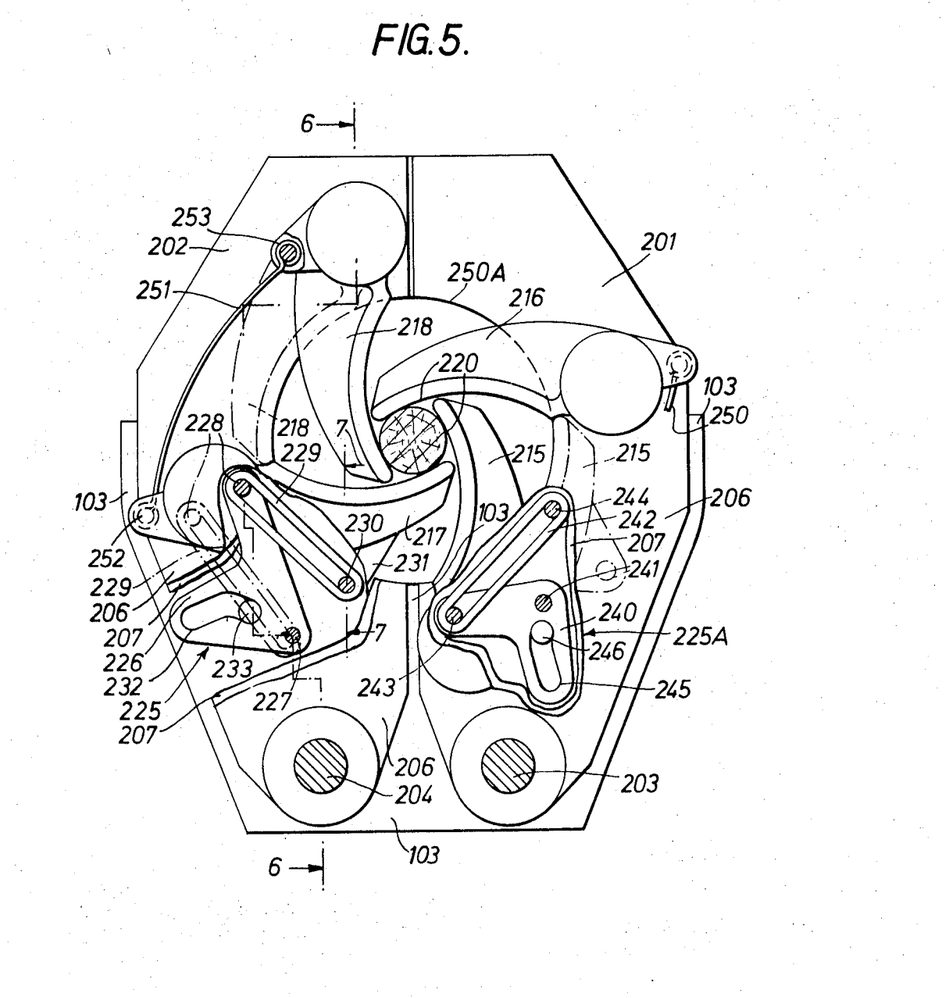
FIG. 5 is a fragmentary elevational view similar to FIG. 4 but illustrating details of the internal mechanism of the delimber.
Figure 6:
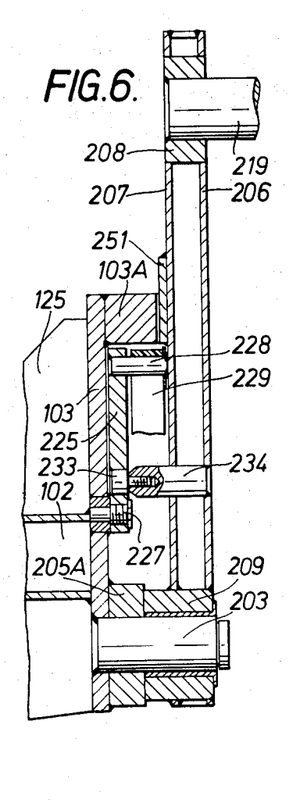
FIG. 6 is a partial cross-sectional view taken substantially along stepped section 6—6 of FIG. 5.
Figure 7:
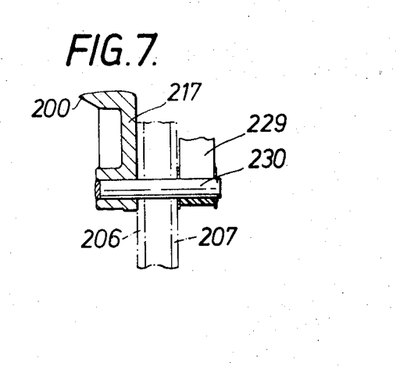
FIG. 7 is a partial sectional view taken substantially along section 7—7 of FIG. 5.
Figure 8:
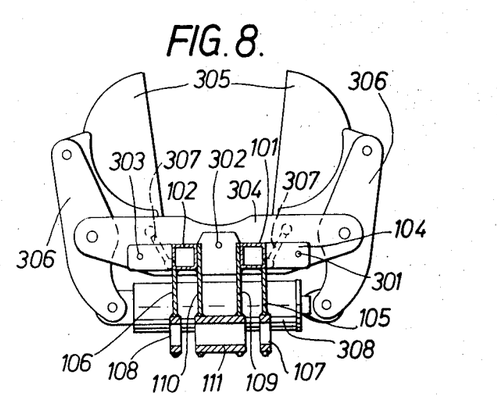
FIG. 8 is a step-sectional view taken substantially along section 8—8 of FIG. 3.

As previously mentioned, the delimber jaw members 201 and 202 are pivotally mounted respectively on pins 203 and 204. The delimber jaw, accordingly, may be opened for receiving a tree and subsequently closed to embrace the tree for processing the same. There are over-centre latch arrangements 225 and 225A associated respectively with the delimber jaw members 202 and 201. The over-centre latches are arranged to retain the delimber arms 201 and 202 in a closed position when closed and in an open position when opened. As will be seen hereinafter, the overcentre locking devices 225 and 225A also include a resilient means normally urging the stripper arm associated therewith against the tree during processing of the same. Referring to FIGS. 5, 6 and 7, the over-centre lock mechanism 225 includes an L-shaped lever member 226 pivotally secured to the flange 103 by a pivot pin 227. The opposite end of the link has a pin 228 projecting outwardly therefrom in a direction toward the plate 207 of the delimber jaw member 202. The pin 228 engages one end of a tension member 229 which, for example, may be a rubber band or the like. The opposite end of the band 229 is looped around a pin 230 which is anchored to a lug 231 of the delimber arm 217 and projects through the plates 206 and 207 into the space between the plate 207 and the frame end flange 103. The link 226 has a cam slot 232 disposed intermediate the pins 227 and 228 and is an arcuate elongated path disposed generally perpendicular to a line drawn through the pins 227 and 228. A cam follower consisting of a roller 233 is located in the cam slot 232 and is anchored to a pin 234 secured rigidly to the plates 206 and 207 as, for example, by welding. The delimber arm 217 is pivotally mounted on one of the pins 219, as previously described, and may be moved toward a tree to be processed or pivoted in an opposite direction. Pivoting in the opposite direction has the effect of moving pin 230 to the left as viewed in FIG. 5, i.e., clockwise about the pivot pin 219 to which the arm 217 is secured. The pin 228, to which the rubber band 229 is anchored, is disposed in the vicinity of pin 219 and, accordingly, the spring maintains substantially constant tension on the arm during pivotal movement of the delimber arm 217 for receiving or processing various sized trees. During opening of the delimber jaw member 202, the cam follower 233 moves through cam slot 232 causing link or lever 226 to pivot about the pivot pin 227. The fully open position is represented in phantom by location of belt 229 at which place the pin 228 is located on the opposite side of the pivot axis of arm 217. The forces of the band 229 on the arm 217, are in opposite directions with respect to the pivotal connection of the arm to the frame respectively in a delimber jaw-closed position and jaw-open position. The link 216 and member 229 accordingly tend to maintain the delimber jaw member 202 in either an open or closed position. It can thus readily be seen the arm 217 is biased against the tree during processing of the tree wherein the delimber jaw members 201 and 202 are in a closed position. The band 229 retains the arms open, as previously described, and this accordingly alleviates the need for continued pressure or control of pressure to hydraulic piston-cylinder assembly 214 which effects opening and closing of the delimber jaw. The jaw member 202 similarly is retained in either an open or a closed position by the over-centre device 225A which includes an L-shaped lever arm 240. The L-shaped lever 240 is pivotally secured to the frame flange 103 by a pin 241 at a position adjacent the apex of the L-shaped arm and the opposite end of one of the legs is anchored to a tension member 242 by a pin 243. The tension member 242 again, as in the case of member 229 is a rubber band or the like, and the other end thereof is anchored to the delimber arm 215 by a pin 244. Pin 244 is secured to the arm and projects rearwardly therefrom through the plate member of delimber jaw 201 to engage the looped band. The other leg of the L-shaped link 204 has a cam slot 245 in which there is located a cam follower 246 consisting of a roller attached to a further pin 234 rigidly secured to the delimber jaw member 201. Again, the pivot axis provided by the pins 203, 243, 241, 244 and 219 (associated with delimber arm 215) is such that the resilient band or spring member 242 biases the arm 215 against the tree while the delimber jaw members 201 and 202 are closed and causes forces in an opposite direction when the jaw members 201 and 202 are open. In the latter position, the delimber jaw members 201 and 202 are retained at such a position by the tension members 242 and 229.

Figure 4:
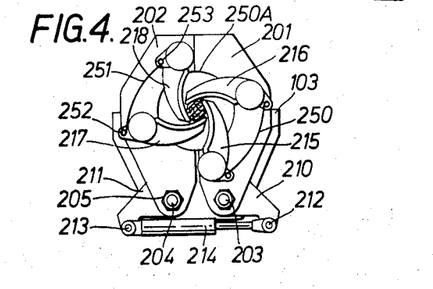
FIG. 4 is a left-hand end elevational view of FIG. 3.

Referring to FIG. 4, the delimber arms 216 and 218 are urged to engage the tree respectively by leaf spring members 250 and 251. The leaf spring member 250 is pivotally attached at one end thereof to a pin anchored in a lug on the arm 215 at a position offset from the pivotal connection of such arm to the delimber jaw member 201. The oposite end of the leaf spring 250 is pivotally attached similarly to a pin on a lug projecting from the delimber arm 216. The leaf spring 251 similarly is pivotally attached respectively by pins 252 and 253 to lugs on respective delimber arms 217 and 218 located adjacent the pivot axis of the respective arms. From the foregoing, it will be readily apparent that tension band 229 urges the arm 217 against a tree during processing to maintain the arm in contact with the tree and this force is transferred to the arm 218 by the leaf spring 251. The motion of arms 217 and 218 accordingly is interrelated but at the same time may move independently of one another by virtue of the spring interconnecting the same, i.e., leaf spring 251. The arms 215 and 216 similarly are interrelated in forces being applied biasing the arms against the tree for processing, while at the same time the arms are permitted to move independent of one another by virtue of the leaf spring 250. Urging the arms inwardly against a tree in this manner permits the individual arms to follow the contour of the tree, whereby the cutting edge 220 is able to follow closely against the surface of the tree and thereby sever the limbs without leaving any substantial length of stump on the tree.

As previously mentioned, the delimber jaw members 201 and 202 are pivotal about the respective pins 203 and 204. Each delimber jaw member 201 and 202 has a semi-circular cut-out portion which together, when the jaws are closed, define a circular opening 250A. A tree being processed follows closely along the axis of the circular opening 250A and such axis is offset at considerable distance from the pivot pins 203 and 204. In order to minimize torsional forces tending to bend the pins 203 and 204, an abutment 103A is secured to the frame flange 103 and projects outwardly therefrom to engage a wear plate 251 on each of the delimber jaw members 201 and 202. The wear plate 251 is fastened to the plate 207 as, for example, by welding, and it will be noted the arrangement is such that the abutment and wear plate engage in a plane passing through the axis of the opening 250A. Forces applied to the delimber arms 201 and 202 accordingly are transferred directly to the frame flange 103. Reinforcement for the flange 103 is provided by a pair of gusset plates 125 secured respectively to the box beams 101 and 102 and the flange 103.

From the foregoing, it is seen that a shear mechanism 300 and a delimber mechanism 200 are located respectively at opposite ends of the frame 100. In order to remove limbs from a tree, it is necessary to move the tree in its axial direction through the delimber opening 250A such that the cutting edge of the arms will sever the branches. A tree feed mechanism 400 is secured to the frame 100 and is located intermediate the delimber and the shear. The feed mechanism 400 consists of a pair of endless or track belt assemblies 401 and 402 each of which is movable toward and away from an axis extending along the axis of the delimber aperture 250A and a plane located intermediate the shear blades 305. Movement of the feed track assemblies in this direction is necessary to accommodate various sized trees. Each feed track assembly 401 and 402 consists of three endless chains 403, disposed in side-by-side parallel relationship and interconnected by a plurality of spiked cleat members 404 extending transversely of the length of the endless chains. The memebers 404 have a plurality of spikes projecting outwardly therefrom to impale the surface of the tree and from FIG. 3, it will be noted that the length of the spikes at the centre of the member 404 is shorter than the spikes at the opposite ends of such member. The spikes being of different lengths have a tendency to centre the tree and keep it in a particular feed path while at the same time provide for engaging considerable peripheral surface of the tree. The latter facilitates transmitting propelling forces from the track members to the tree for moving the latter along the linear feed path which, as previously described, is substantially horizontal.

The endless track 405, which consists of the endless chains 403 interconnected by the spiked cross members 404, passes over a driven drum 406 and an idler drum 407 disposed in horizontal spaced relation. The drums 406 and 407 are disposed between and journalled to a pair of frame plate members 408 and 409 located one on each side of the endless belt 405. A tension idler 410 may be adjustably mounted on the plates 408 and 409 and engage the endless track 405 intermediate the drums 407 and 408. The idler 410 accordingly may be appropriately set to provide desired tension and take up the slack in the endless belt. The feed roll assemblies 401 and 402 are each movably mounted on the common frame 100 by a pair of link members 411 and 412 pivotally secured at one end to the frame and at the other end to the feed roll assembly. The links 411 are pivotally attached to lugs 117, 118 on the frame 100 by the pivot pin 413 and at the other end to the feed belt frame member 408 by a pin 414. Similarly, the links 412 are each pivotally connected to the frame lugs 114, 115 by the pin 415 and to the frame member 408 by a pin 416. The links 411 and 412 are arranged such as to provide a parallelogram whereby the entire feed roll mechanism may be moved toward and away from a tree for engaging and disengaging the same. The drum 406 is driven by a hydraulic motor M1 through a transmission and gear mechanism 425. The motor M1 is connected to the transmission and gear mechanism 425 by a coupling 426. The drive drum 406 is provided wtih means, for example, cogs to engage the link chain members and thereby transfer the driving force from the roll 406 to the three link chains 403. It is obvious that other types of drives may be utilized for effecting movement of the endless chain 405. Also, the chains 405 may be replaced by one or more sets of feed rolls of the type, for example, disclosed in applicant's U.S. Pat. No. 3,351,107 issued Nov. 7, 1967.

In operation, the operator manoeuvers the vehicle 20 into the general vicinity of one or more standing trees. Motion of the vehicle is then stopped and the operator manoeuvers the extendible and retractable boom 30 and also the felling head 40 to place the grapple jaws in embracing relation around a tree to be severed and thereafter the tree is severed, by suitable control of hydraulic circuitry to the shear actuating cylinder 43A. After the tree has been severed, the operator manoeuvers the felling head to fell the tree. During felling, the tree is manoeuvered into a position rearwardly of the vehicle and the butt end of the truck is lowered to a position between the pair of feed chains 401 and 402. In order to effect this, the operator has previously moved the delimber jaw members 201 and 202 to an open position. The delimber jaws are then closed and feed chains 405 are moved inwardly to engage the tree. The feed chains are then driven by their respective motors M1 to propel the tree longitudinally through the delimber. The tree is moved in intervals depending upon the length of section to be severed from the leading end. A switch for actuating the shear 300 is actuated in response to movement of the tree depending upon the length to be severed, at which time the feed roll assemblies are stopped and the shear cylinder 308 is than actuated to sever the leading end of the tree from the remainder of the tree. The severed end falls by gravity into the cradle 60 and after the severing operation is completed, feed members 401 and 402 are again actuated to feed a further length of tree for processing. As previously mentioned, the processing assembly 70 is mounted on the free end of an arm 71 which is vertically movable relative to the cradle. In FIG. 1, the processing assembly is illustrated in phantom in an initial position designated generally by the letter D. During processing of trees, the cradle 60 becomes filled and the processing assembly is moved vertically depending upon the amount of load such that the tree severed by the processing assembly has a minimum distance of drop onto previously processed logs located in the cradle. This permits stacking the processed trees in a relatively neat pile. The processor in FIG. 1 is illustrated in solid in the normal position where the cradle would be full and a partial phantom illustration of the processor is noted at position E where it has been raised for discharging logs from the cradle. The operator accordingly continues to control operation of the delimber, feed rolls, shear, felling head and extendible and retractable boom to sever standing trees, felled trees, and process the felled trees in sequence, collecting the processed trees in the cradle and when a load has been collected, the processing assembly is moved to position E by the operator, whereafter the cradle is moved to a dumping position. As previously mentioned, the dumping position in FIG. 1 is illustrated in phantom and designated in general by the letter B.

From the foregoing, it is seen there is provided a mobile vehicle for use in severing and processing standing trees. The entire vehicle may be referred to generally as a stump processor. It will also be noted that the processing assembly is located rearwardly of the vehicle and the arrangement thus permits moving the vehicle while processing. In the event of such operation, the top end of the tree is dragged along the ground while it is fed through the processing unit and the entire machine, in effect, acts in such instance as a skidder. The controls for the various components may be automated relieving the operator of the responsibility of manual control for the delimber, shear, feed rolls, and vertically moving the processing assembly depending upon the load in the cradle, whereby he is free to manipulate the vehicle into the vicinity of further trees for processing and/or manipulate the extendible and retractable boom as well as the felling head for felling further standing trees for processing.

As previously mentioned, a selected length of the leading end of a tree being processed is severed by the shear mechanism 300 and the severed section falls into the cradle located vertically therebelow. The shear mechanism 30 is actuated in response to severing a selected length and such length may be determined, for example, by a butt plate 600 secured to the chassis of the vehicle 20. The butt plate member 600 consists of an arm pivotally mounted on the chassis having a free end portion engageable with the leading end of a tree being processed. When the butt plate member 600 is struck by the tree, it is moved to the left as viewed in FIG. 1 whereupon it actuates a switch, first to stop the feed mechanism 400 and therefater actuate the shear 300 for severing the tree. After the tree has been severed, movement of the blades of shear 300 to an open position may be utilized to actuate a further switch to start the feed mechanism 400 for feeding a further length of tree through the processing assembly. In this regard, the intermittent operation may, in some instances, cause limbs to be stopped adjacent the delimber stripper arms. In this case, considerable force is required to propel the tree. The motor M1 is reversible so that in such instance the feed rolls may be reversed to move the tree to the right, as viewed in FIG. 1. The feed mechanism may then be driven in its initial feed direction to propel the tree axially through the processing assembly and the momentum of the tree then facilitates severing the branches.

The feed mechanism 400 is illustrated as consisting of a pair of endless chain members having a spiked surface. In order to facilitate moving the tree through the processing assembly, one or more freely rotatable or driven rollers may be utilized. In this regard, there is illustrated in FIG. 1, a roller 450 secured to the frame 100 adjacent the delimber 200. A further roller 451 is illustrated in FIG. 1 adjacent the shear mechanism 300. The rollers 450 and 451 each have their axis substantially horizontal and the rollers may be driven or freely rotatable. The rollers obviously are anti-friction means which can engage the tree during processing thereof and, if desired, may be replaced by wear plates or the like which would provide a suitable support for the tree while, at the same time, permit sliding therealong.

The processing assembly 70 is illustrated being attached to a vehicle independent of the extendible and retractable boom assembly 30. The processing assembly may be utilized, however, for severing standing trees and thereafter processing the severed tree. In such instance, the entire processing assembly 70 may be secured to the free end of an extendible and retractable boom, for example, by a pivot pin 72 passing through an aperture in the boom member 32. The felling head cylinder 42, in such instance, may be connected to the processor frame 100 by a pin passing through the aligned apertures 112 and 113. In such an installation, the processor would be mounted such that the shear 300 would be at the lower end and could be utilized to sever a standing tree. The entire assembly may then be utilized to fell the tree whereafter the felled tree may be drawn through the processing assembly to remove the limbs and/or bark, and the shear 300 again, in such instance, be utilized to sever the tree into selected lengths by removing leading end portions in sequence.

We claim:
1. A mobile tree processor comprising:
   a. a vehicle;
   b. an articulated boom assembly including a main boom and a reach boom;
   c. first means mounting said main boom at one end for pivotal movement about a generally horizontal axis;
   d. second means mounting said first means on said vehicle for rotation about a general vertical axis, said reach boom having one end pivotally connected to the other end of said main boom;
   e. a vertically disposed shear mechanism mounted on said vertical for severing trees into selected lengths;
   f. tree shear means carried on said reach boom for cutting a standing tree;

g. grapple means carried on said reach boom above said tree-cutting means for grappling a standing tree severed by said tree-cutting means, said grapple means being pivotal through an angle of approximately 90° so that a tree after it is cut by said tree-cutting means can be tilted from its generally vertical position into a generally horizontal position and positioned generally longitudinally of said vehicle in substantial alignment with said vertically disposed shear mechanism;

h. power means for pivoting said grapple means;

i. delimber means movably mounted on the vehicle and including knife means for removing branches from said cut tree;

j. means between said knife means and said shear mechanism for pulling the cut tree relative to said knife means to remove branches therefrom and simultaneously feeding a desired length of said cut tree to said shear mechanism, whereby said shear mechanism severs successive bolts from said cut tree after the delimbing thereof by said delimbing means; and k. collector means movably mounted on the vehicle for receiving the processed trees.

2. A tree harvester as defined in claim 1 wherein said cradle, in an unloading position, is disposed rearwardly of the position at which the cradle is located during loading thereof.

3. A tree harvester as defined in claim 2 wherein said cradle is a bottom dump type permitting unloading logs collected therein by dumping the same vertically downwards.

4. A mobile tree processor comprising:

a. a vehicle;

b. an articulated boom assembly including a main boom and a reach boom;

c. first means mounting said main boom at one end for pivotal movement about a first axis;

d. second means mounting said first means on said vehicle for rotation about a second axis, said reach boom having one end pivotally connected to the other end of said main boom;

e. a vertically disposed shear mechanism mounted on said vehicle;

f. tree-cutting means carried on said reach boom comprising a shear for cutting a standing tree;

g. grapple means carried on said reach boom above said tree-cutting means for grappling a standing tree severed by said tree-cutting means, said grapple means being pivotal through an angle of approximately 90° so that a tree after it is cut by said tree-cutting means can be tilted from its generally vertical position into a generally horizontal position;

h. power means for pivoting said grapple means;

i. a delimber unit movably mounted on said vehicle and including knife means for removing branches from said cut tree;

j. tree feed means movably mounted on said vehicle and located a position between said knife means and said vertically disposed shear mechanism for pulling the cut tree relative to said knife means to remove branches therefrom and simultaneously feeding a desired length of said cut tree to said shear mechanism, whereby said shear mechanism severs successive bolts from said cut tree after the delimbing thereof by said delimbing means; and k. collector means movably mounted on the vehicle for receiving the processed trees.

5. A mobile tree processor comprising:

a. a vehicle;

b. an articulated boom assembly including a main boom and a reach boom;

c. first means mounting said main boom at one end for pivotal movement about a generally horizontal axis;

d. second means mounting said first means on said vehicle for rotation about a general vertical axis, said reach boom having one end pivotally connected to said main boom;

e. a vertically disposed shear mechanism mounted on said vehicle;

f. tree-cutting means carried on said reach boom for cutting a standing tree;

g. grapple means carried on said reach boom above said tree-cutting means, for grappling a standing tree severed by said tree-cutting means, said grapple means being pivotal through an angle of approximately 90° so that a tree after it is cut by said tree-cutting means can be tilted from its generally vertical position into a generally horizontal position and located generally longitudinally of said vehicle in substantial alignment with said vertically disposed shear mechanism;

h. power means for pivoting said grapple means;

i. a delimber unit movably mounted on said vehicle and including knife means for removing branches from said cut tree;

j. tree feed means movably mounted on the vehicle and located at a position between said knife means and said shear mechanism for pulling the cut tree relative to said knife means to remove branches therefrom and simultaneously feeding a desired length of the tree to said vertically disposed shear mechanism, whereby said shear mechanism severs successive bolts from said cut tree after the delimbing thereof by said delimbing means; and k. collector means movably mounted on said vehicle for receiving the processed trees.

* * * * *

PO-1050
(5/69)

UNITED STATES PATENT OFFICE
CERTIFICATE OF CORRECTION

Patent No. 3,763,905           Dated October 9, 1973

Inventor(s) Douglas D. Hamilton et al

It is certified that error appears in the above-identified patent and that said Letters Patent are hereby corrected as shown below:

In claim 1, line 13, change "vertical" to -- vehicle --.

Signed and sealed this 2nd day of April 1974.

(SEAL)
Attest:

EDWARD M. FLETCHER, JR.          C. MARSHALL DANN
Attesting Officer                  Commissioner of Patents